United States Patent [19]
Sato

[11] Patent Number: 6,102,315
[45] Date of Patent: Aug. 15, 2000

[54] MASTER GEAR FOR A SPINNING REEL

[75] Inventor: Jun Sato, Sakai, Japan

[73] Assignee: Shimano Inc., Sakai, Japan

[21] Appl. No.: 09/393,164

[22] Filed: Sep. 10, 1999

[30] Foreign Application Priority Data

Sep. 17, 1998 [JP] Japan .................................. 10-263184

[51] Int. Cl.[7] .................................................. A01K 89/00
[52] U.S. Cl. .......................... 242/249; 242/278; 242/282
[58] Field of Search .................................... 242/249, 263, 242/278, 282, 283, 284, 253, 255

[56] References Cited

U.S. PATENT DOCUMENTS

| | | | |
|---|---|---|---|
| 2,712,419 | 7/1955 | Martini | 242/282 X |
| 2,799,457 | 7/1957 | Martini | 242/282 |
| 2,974,895 | 3/1961 | Wood | 242/282 X |
| 3,018,979 | 1/1962 | Clickner | 242/249 X |
| 4,196,867 | 4/1980 | Miller | 242/249 |
| 4,482,106 | 11/1984 | Kovalovsky . | |
| 4,732,348 | 3/1988 | Young | 242/282 X |
| 4,995,571 | 2/1991 | Kawai | 242/249 |
| 5,381,979 | 1/1995 | Furomoto | 242/282 X |
| 5,690,289 | 11/1997 | Takeuchi et al. | 242/282 |
| 5,863,007 | 1/1999 | Sato | 242/249 X |

FOREIGN PATENT DOCUMENTS

| | | |
|---|---|---|
| 0711500 | 11/1995 | European Pat. Off. . |
| 0898884 | 11/1997 | European Pat. Off. . |
| 9821941 | 5/1998 | WIPO . |

*Primary Examiner*—Donald P. Walsh
*Assistant Examiner*—Emmanuel M. Marcelo
*Attorney, Agent, or Firm*—Shinjyu An Intellectual Property Firm

[57] ABSTRACT

A master gear 11 for a spinning reel transmits a rotational torque of a handle assembly 1 to a rotor 3 via a pinion gear 12. The master gear 11 includes a master gear shaft 10, a gear attachment portion 11a, and a gear member 11b. The master gear shaft 10 is rotatably supported by a reel main body 2 at both ends thereof, and has a first female screw portion 10b and a second female screw portion 10d formed on both end surfaces thereof. The gear attachment portion 11a includes a flange portion 11d which is formed on an inward position with respect to a portion of the gear attachment portion 11a at which rotation of the master gear shaft 10 is supported. The gear member 11b includes a disk portion 11e and a face gear portion 11f. The disk portion 11e is non-rotatably coupled to the flange portion 11d of the gear attachment portion 11a. The face gear portion 11f is formed on an outer peripheral portion of the disk portion 11b, and is adapted to couple with the pinion gear 12.

10 Claims, 6 Drawing Sheets

Fig. 6

MASTER GEAR FOR A SPINNING REEL

BACKGROUND OF THE INVENTION

A. Field of the Invention

The present invention relates to a master gear, more specifically, a master gear for a spinning reel that is rotatably supported by portions of a reel main body of the spinning reel for transmitting a rotational movement from a handle attached to the master gear to a rotor via a pinion gear.

B. Description Of Related Art

A spinning reel generally includes a reel main body that is attachable to a fishing rod, a rotor rotatably supported by the reel main body, and a spool disposed on a front side of the rotor, the spool having an outer peripheral portion about which a fishline is wound. The rotor rotates together with a pinion gear that is disposed on an outer periphery of a spool shaft. The spool is moved back and forth repeatedly by an oscillating mechanism which has an intermediate gear adapted to engage the pinion gear. The pinion gear also engages a master gear which has a shaft portion perpendicular to the pinion gear. The handle is coupled to the shaft portion of the master gear. When the handle is rotated, the rotational movement is transmitted through master gear to the pinion gear and then to the oscillating mechanism. The master gear has a face gear portion on an outer periphery thereof that engages the pinion gear.

In a large spinning reel, the handle is typically attached to the shaft portion of the master gear via threads formed within one end of the shaft portion of the master gear, such that the durability of the shaft portion is maintained and rattling is prevented. If the shaft portion, into which the handle is threaded, is made of an aluminum or zinc alloy, the threads of the shaft portion may not be rigid enough to withstand repeated attachment and detachment of the handle. Specifically, the shaft portion may experience premature wear. As a result, conventional large spinning reels have a face gear portion and a shaft portion formed integrally by forging brass, or by inserting a shaft portion made of a stainless alloy in a metal template and thereafter die casting a face gear portion by injection molding a zinc.

Problems To Be Solved By The Invention

Since above mentioned conventional master gears have a face gear portion made by die casting zinc or brass, it is difficult to make a master gear lighter. If all the members of a master gear are made of an aluminum alloy, the master gear will be lighter, but the threaded portion of the shaft portion may not be rigid enough to resist wear.

SUMMARY OF THE INVENTION

The object of the present invention is to make a master gear of a spinning gear lighter while maintaining the rigidity of a shaft portion.

In accordance with one aspect of the present invention, a master gear for a spinning reel is rotatably supported by a reel main body of the spinning reel. The master gear is adapted to transmit a rotation of a handle to a rotor via a pinion gear. The master gear includes a shaft portion rotatably supported by the reel main body at opposite ends thereof. The shaft portion has threads formed on portions of inner surfaces thereof. A gear attachment portion has a flange portion, the flange portion being spaced apart from portions of the shaft supported by the reel main body. A gear member has a disk portion and a face gear portion, the disk portion being non-rotatably attached to the flange portion of the gear attachment portion, the face gear portion being disposed on an outer periphery of the disk portion and adapted to engage the pinion gear.

Preferably, the gear attachment portion is made integrally with the shaft portion, and the gear attachment portion and the shaft portion is made of the same material.

Preferably, the shaft portion and the gear attachment portion are made of a stainless steel alloy.

Preferably, the shaft portion is made of a stainless alloy and the gear attachment portion is made of a material different from the shaft portion.

Preferably, the gear attachment portion is made of a synthetic resin.

Preferably, the gear attachment portion is made of a zinc alloy.

Preferably, the gear attachment portion is formed integrally with the shaft portion.

Preferably, the gear member is of forged aluminum alloy.

Preferably, the disk portion of the gear member is made of forge aluminum alloy and the face gear portion is made by die casting a zinc alloy so as to be formed integrally with the disk portion.

Preferably, the gear member is coupled to the gear attachment portion with a screw.

In the master gear, the handle is attached to threaded holes formed on the shaft portion. Also, the disk portion of the gear member is non-rotatably coupled to the flange portion of the gear attachment portion, which is disposed on the shaft portion. Therefore, the gear member which is made of a light material can be attached to the shaft portion which is made of a rigid material, via the gear attachment portion. As a result, the master gear can be made lighter while maintaining the rigidity of the shaft portion.

By making the shaft portion and the gear attachment portion integrally from a rigid material such as a stainless alloy, the rigidity of the shaft portion can be maintained while simplifying the structure of the master gear.

Since the shaft portion and the gear attachment portion can be made of a stainless alloy, the rigidity of the shaft portion and gear attachment portion can be maintained.

Since the gear member is insulated from the shaft portion, the gear attachment portion can be made lighter while preventing an electrolytic corrosion, which occurs between metals that contact each other.

By using a zinc alloy, the gear attachment portion can be manufactured cheaply and easily while maintaining the rigidity.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE INVENTION

Overall Structure

Figure 1:
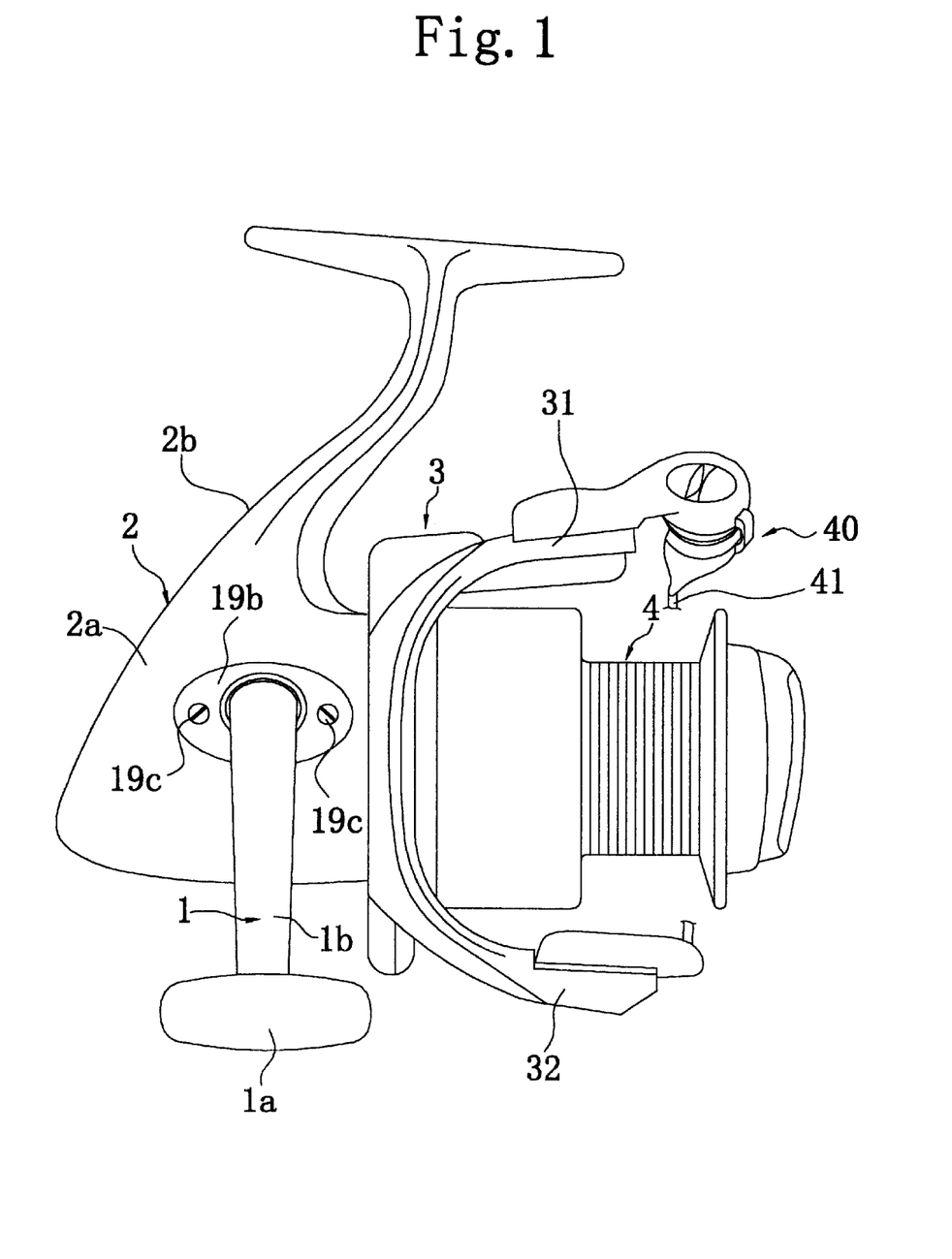
FIG. 1 is a side plan view of a spinning reel in accordance with one embodiment of the present invention.
Figure 2:
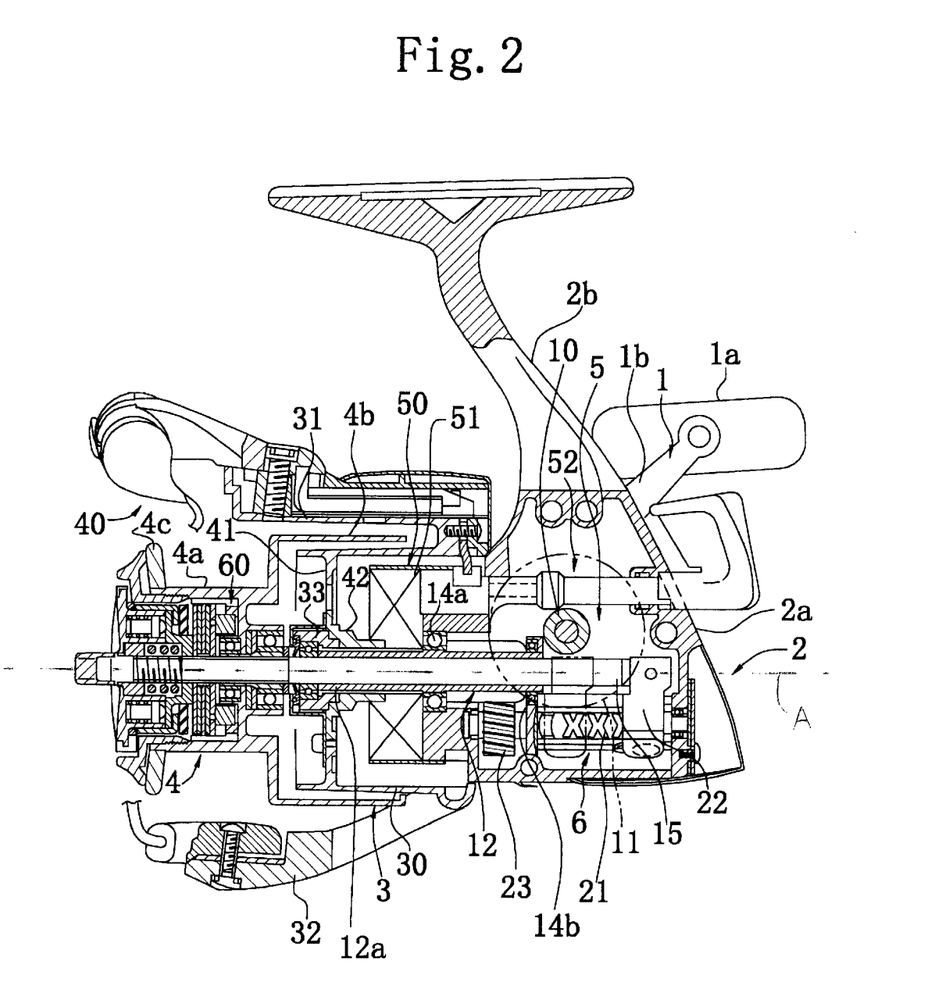
FIG. 2 is a side cross-sectional view of the spinning reel in accordance with the present invention.

A spinning reel in accordance with a first embodiment of the present invention is described below with reference to FIGS. 1 and 2. The spinning reel shown in FIGS. 1, 2, 3 and 4 is, relative to most spinning reels, a large spinning reel that is able to hole about 200 m of size 8 fishline, with the fishline wound about a spool 4, described in greater detail below. The spinning reel includes a reel main body 2, a rotor 3 that is supported on the reel main body 2 about an axis A (FIG. 2), the spool 4, and a handle assembly 1 that is rotatably supported on the reel main body 2. As is described in greater detail below, rotation of the handle assembly 1 with respect to the reel main body 2 causes the rotor 3 to rotate and causes the spool 4 to undergo oscillations along the axis A (FIG. 2) in order to receive the fishline.

The rotor 3 is rotatably supported by a front portion of the reel main body 2 and is rotatable about the above mentioned axis A. The spool 4 has an outer peripheral surface about which the fishline is wound, and is disposed on a front portion of the rotor 3 so as to be movable back and forth (oscillate) along the axis A.

Structure of the Handle Assembly

Figure 3:
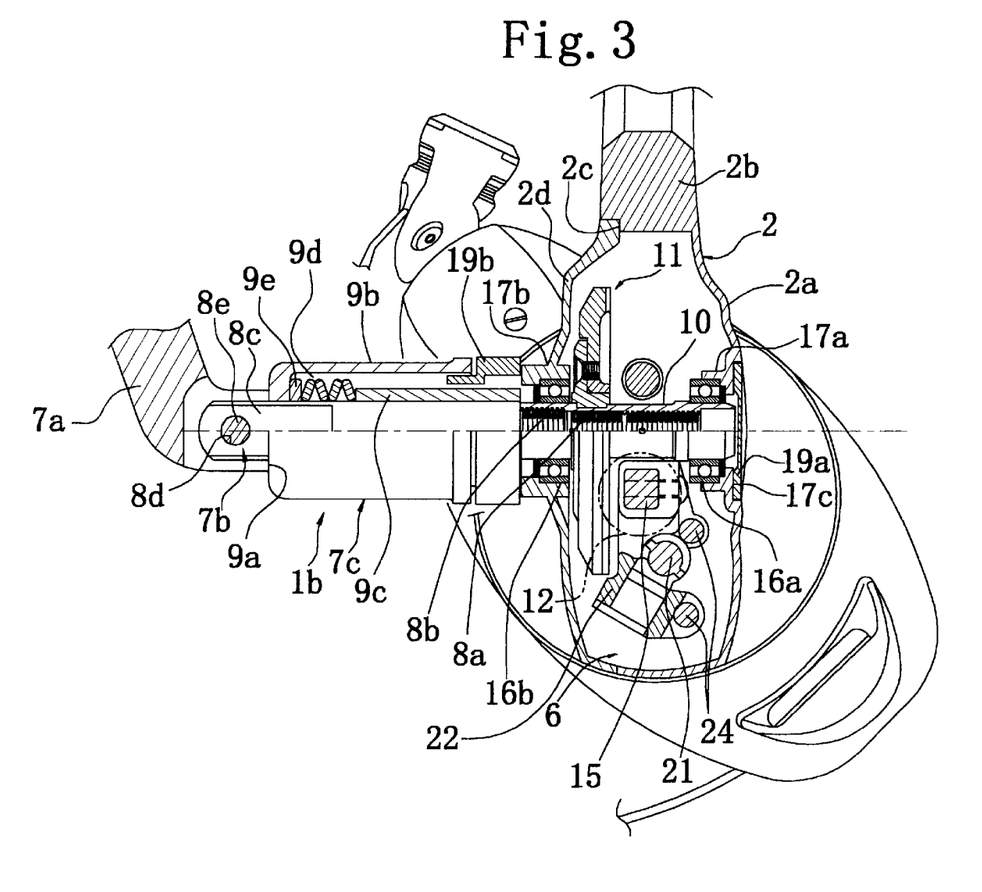
FIG. 3 is a back side cross-sectional view of the spinning reel depicted in FIG. 1.

As shown in FIG. 3, the handle assembly 1 is threaded into a master gear shaft 10, as is described below. As shown in FIG. 1, the handle assembly 1 includes a T-shaped handle portion 1a and a L-shaped crank arm 1b. The handle portion 1a is rotatably attached to an end of the crank arm 1b. With reference again to FIG. 3, the crank arm 1b includes an arm portion 7a, a shaft portion 7b, and an attachment portion 7c. A base end of the arm portion 7a is pivotally coupled to the shaft portion 7b. The attachment portion 7c has a cup-like shape and extends around a portion of the shaft portion 7b, as is described in greater detail below. The attachment portion 7c is substantially concentric with the shaft portion 7b with the shaft portion 7b extending beyond the end of the attachment portion 7c such that the distal end of the shaft portion 7c is threaded into the master gear shaft 10.

The shaft portion 7b has a rod-shaped cross section. On the distal end (toward the right side of FIG. 3) of the shaft portion 7b, a first male screw portion 8a and a second male screw portion 8b are formed concentrically and axially next to each other. The first male screw portion 8a is a right-handed screw (a screw that is threaded in when it rotates in a clockwise direction). The second male screw portion 8b is a left-handed screw (a screw that is threaded in when it rotates in a counter-clockwise direction) that has a larger diameter than the first male screw portion 8a. Accordingly, the handle assembly 1 can be attached to either the right side of the reel main body 2 as shown in FIGS. 1 and 2, or the left side of the reel main body 2 as shown in FIG. 3.

On a base end of the shaft portion 7b, flat surfaces 8c are formed parallel to each other. A bore 8d is formed on the flat surfaces 8c for receiving therein a pivot pin 8e which pivotally supports the arm portion 7a on the shaft portion 7b. The arm portion 7a is pivotally coupled to the shaft portion 7b via the pivot pin 8e.

The attachment portion 7c includes a contacting portion 9a, a shaft cover 9b, and a pressure member 9c. The contacting portion 9a defines an end surface of the arm portion 7a. The shaft cover 9b has a cylindrical-shape that encircles an outer periphery of a portion of the shaft portion 7b but is spaced apart from the shaft portion 7b. The pressure member 9c surrounds a portion of the shaft portion 7b and is located between the outer surface of the portion of the shaft portion 7b and the shaft cover 9b.

The contacting portion 9a of the attachment portion 7c is formed with an opening that engages the flat surfaces 8c of the shaft portion 7b such that the shaft cover 9b cannot rotate relative to the shaft portion 7b. In this way, the shaft portion 7b can be rotated by rotation of the shaft cover 9b such that the shaft portion 7b may be threaded into the master gear shaft 10 and later removed (unthreaded) from the master gear shaft 10 by rotation of the shaft cover 9b. An end of the shaft cover 9b extends around a tubular cover 19b that is supported on the reel main body 2.

The pressure member 9c is tubular in shape and is coupled to the shaft portion 7b but is rotatable and axially movable with respect to the shaft 7b, as is described further below. The end of the pressure member 9c contacts the master gear shaft 10 while the handle assembly 1 is attached thereto. On the outer periphery of the shaft portion 7b between the pressure member 9c and the contacting portion 9a of the shaft cover 9b there are four plate springs 9d that are arranged as two pairs of plate springs. Further, between the contacting portion 9a and the plate springs 9d a washer 9e is disposed encircling the shaft portion 7b. The two pairs of plate springs 9b contact each other at outer peripheries thereof. When the handle assembly 1 is attached to the master gear shaft 10 the plate springs 9d are compressed between the pressure member 9c and the washer 9e such that the biasing force of the plate springs 9d biases the pressure member 9c into firm engagement with the master gear shaft 10 thereby preventing the shaft portion 7b from becoming unscrewed from the master gear shaft 10. Specifically, the biasing force that urges the pressure member 9c against the master gear shaft 10 helps to retains one of the first male screw 8a or the second male screw 8b in threaded engagement with the corresponding threads in the master gear shaft 10. As well, with the plate springs 9d under compression, the contacting portion 9a further contacts an end surface of the arm portion 7a such that the arm portion 7a is not able to pivot about the pin 8e.

When the handle assembly 1 is to be removed from the master gear shaft 10, the shaft cover 9b is rotated to loosen the threaded engagement between the shaft portion 7b and the master gear shaft 10. As the shaft portion 7b begins to become unscrewed (unthreaded) from the master gear shaft 10, the plate springs 9d expand and are no longer compressed, and the contacting portion 9a becomes separated from the shaft cover 9b. The contacting portion 9a also comes out of contact with the end surface of the arm portion 7a of the crank arm 1b. Accordingly, the crank arm 1b can easily pivot about the pivot pin 8e. When the handle assembly 1 is threaded in by rotating the shaft cover 9b, the contacting portion 9a contacts the end surface of the arm portion 7a whereby the handle assembly 1 is retained rigidly in an attachment state where the crank arm 1b cannot pivot about the pivot pin 8e. While the handle assembly 1 is attached to the master gear shaft 10, the plate springs 9d bias the pressure member 9c towards the master gear shaft 10, whereby the attachment of the handle assembly 1 to the master gear shaft 10 does not come loose easily.

Structure of Reel Main Body

As is shown in FIGS. 1, 2 and 3, the reel main body 2 includes a reel body 2a and a leg 2b. The reel body 2a has an opening 2c on a side portion thereof (the opening 2c is open toward the left side of FIG. 3). The leg 2b has a shape resembling the letter T and is shaped to connect the reel main body to a portion of a fish rod (not shown). The leg 2b is formed on the reel body 2a integrally therewith, and extends in an upward direction therefrom. The opening 2c is shaped to receive a lid member 2d thereby closing the reel main body.

As shown in FIG. 2, inside the reel body 2a there is a space for many elements which define several mechanisms. The space within the reel body 2a is accessed via the opening 2c by removing the lid member 2d. Within the space within the reel body 2a are a rotor driving mechanism 5 for rotating the rotor 3 in response to rotation of the handle assembly 1, and an oscillating mechanism 6 that moves the spool 4 back and forth along the axis A such that the fishline (not shown) may be uniformly wound around the spool 4 by rotation of the rotor 3.

Figure 4:
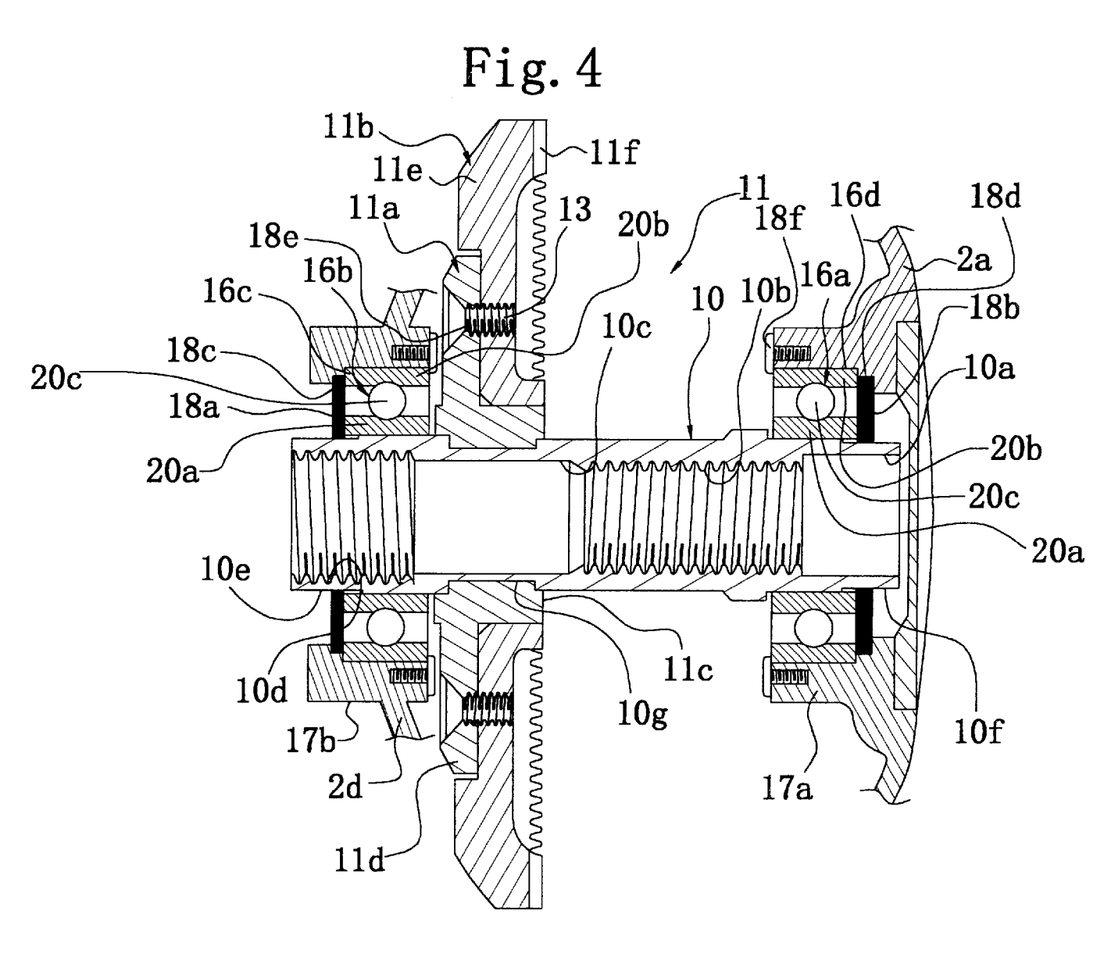
FIG. 4 is a fragmentary cross-sectional view of a master gear of the spinning reel depicted in FIG. 1 on a slightly enlarged scale.

As shown in FIGS. 3 and 4, a cylindrical boss portion 17a is formed on one side of the reel body 2a (toward the right side of FIG. 4). The boss portion 17a extends inwardly within the reel body 2a for supporting a bearing 16a which supports one end of the master gear shaft 10. Another boss portion 17b is formed on the lid member 2d opposing the boss portion 17a, and with the lid member 2d fixed in the opening 2c, the boss portion 17a and boss portion 17b are axially aligned. The boss portion 17b extends both inward and outward from the space within the reel body 2a for supporting a bearing 16b which further supports another end of the master gear shaft 10 (on the left side of FIG. 4). The boss portion 17a of the reel body 2a is covered by a shaft cover 19a. However, the shaft cover 19a can be removed and the handle assembly 1 may be threaded into the main gear shaft 10 via the opening defined by the bearing 16a.

The tubular cover 19b may be coupled to either of the boss portions 17a or 17b on opposite sides of the reel body 2a, depending upon which side of the reel body 2a the handle assembly 1 is attached to (i.e. for a left-handed user or a right handed user). The tubular cover 19b prevents water from entering the reel main body 2a. As shown in FIG. 1, the shaft cover 19a and tubular cover 19b are oval members, both adapted to be coupled to either boss portion 17a and 17b by two small bolts 19c. The surface of the reel body 2a around the boss portion 17a is formed with an oval recess 17c for attachment of either the shaft cover 19a or the tubular cover 19b.

Structure of Rotor Driving Mechanism

As shown in FIG. 3, the rotor driving mechanism 5 includes a master gear 11 to which the handle assembly 1 is non-rotatably attached via the master gear shaft 10. The rotor driving mechanism 5 also includes the pinion gear 12 that has gear teeth engaged with corresponding gear teeth formed on the master gear 11.

As shown in FIG. 4, the master gear 11 includes the master gear shaft 10, a gear attachment portion 11a integrally formed with the master gear shaft 10, and the gear member 11b detachably coupled to the gear attachment portion 11a.

The master gear shaft 10 is a hollow member made of a stainless steel material. Both ends of the master gear shaft 10 are rotatably supported by the reel body 2a and the lid member 2d via the bearings 16a and 16b. The bearings 16a and 16b are rotary bearing, each having an inner race 20a, an outer race 20b, and ball bearings 20c. The seal rings 18a and 18b made of an elastic material such as NBR are disposed adjacent to the outer peripheral surface of the master gear shaft 10, and axially outward from the internal space of the reel body 2a, the inner race 20a and the outer race 20b of the bearings 16a and 16b, respectively.

The seal rings 18a and 18b are washer-like members, tightly retained within seal coupling recesses 18c and 18d, which are formed in the lid member 2d and reel body 2a, respectively, axially outward from the bearings 16a and 16b. Inner radiuses of the seal coupling recesses 18c and 18d (outer radiuses of the seal rings 18a and 18b) are smaller than outer radiuses of the bearings 16a and 16b. Axial lengths of the seal coupling recesses 18c and 18d are slightly smaller than thicknesses of the seal rings 18a and 18b. Inner peripheries of the seal rings 18a and 18b are disposed adjacent to seal surfaces 10e and 10f of the master gear shaft 10. Outer radiuses of the seal surfaces 10e and 10f are smaller than the radiuses of the portion of the main gear shaft 10 that contacts the bearings 16a and 16b.

Small bolts 18e and 18f are threaded into the boss portions 17a and 17b contacting the outer races 20b of the bearings 16a and 16b. The small bolts 18e and 18f through the outer races 20b force the seal rings 18a and 18b into firm engagement with the seal coupling recesses 18c and 18d such that the seal rings 18a and 18b seal outer peripheral portions thereof without rotating with the master gear shaft 10. Since the seal surfaces 10e and 10f have smaller radiuses than the bearing attachment surfaces, it is less likely that the seal surfaces 10e and 10f are damaged. Further, after repeated attachment and detachment of the handle assembly 1, if the master gear shaft 10 should be deformed thereby extending farther in a radially outward direction, the seal rings 18a and 18b may still provide a reliable seal. Also, since the seal coupling recesses 18c and 18d have smaller radiuses than the outer races 20b, thrust forces that are applied to the bearings 16a and 16b can be directly supported by the reel body 2a and the lid member 2d.

As shown in FIG. 4, the master gear shaft 10 is formed with a first through bore 10a, a first female screw portion 10b, a second through bore 10c, and a second female screw portion 10d all formed concentrically and axially aligned in the above recited order from the right side of FIG. 4 to the left side of FIG. 4. The second female screw portion 10b opens to the left end of the master gear shaft 10. The axial length of the first through bore 10a is substantially the same as the axial length of the second female screw portion 10d. The first through bore 10a has a larger radius than the second female screw portion 10d, such that the second male screw portion 8b of the shaft portion 7b can be inserted therethrough. The first female screw portion 10b is formed with right-handed screw threads, into which the first male screw portion 8a of the shaft portion 7b can be threaded. The axial length of the first female screw portion 10b is slightly longer than the axial length of the first male screw portion 8a. The axial length of the second through bore 10c is substantially the same as the axial length of the first female screw portion 10b. The second through bore 10c has a larger diameter than the first female screw portion 10b, such that the first male screw portion 8a can be inserted therethrough. The second female screw portion 10d is threaded with left-handed screw threads, into which the second male screw portion 8b of the shaft portion 7b can be threaded.

On portions of the outer surface of the master gear shaft 10 are flat surfaces 10g formed parallel to each other for engagement with corresponding surfaces of the gear attachment portion 11a. The gear attachment portion 11a is formed on the flat surfaces 10g integrally with the master gear shaft 10 by press fitting the master gear shaft 10 into the gear attachment portion 11a or other means. The gear attachment portion 11a is made of a zinc alloy, which can be molded integrally with a stainless alloy easily. The gear attachment portion 11a includes a boss portion 11c and a flange portion 11d. The boss portion 11c is fixedly coupled to the master gear shaft 10, as described above. The flange portion 11d is formed on an outer periphery of the boss portion 11c. The gear member 11b is detachably coupled to the flange portion 11d by a plurality of bolts 13. The gear member 11b is a disk shaped member made by forging an aluminum alloy. Therefore, the gear member 11b is relatively light. The gear member 11b includes a disk portion 11e and the face gear portion 11f. The disk portion 11e is non-rotatably coupled to the flange portion 11d. The face gear portion 11f is formed on the outer peripheral portion of the disk portion 11e, and is adapted to engage gear teeth formed on the pinion gear 12.

As shown in FIG. 2, the pinion gear 12 is a tubular member disposed extending around a portion of the axis A in a generally central portion of the reel body 2a. The pinion gear 12 is restrained within the reel body 2a against axial movement along the axis A, but rotates about a spool shaft 15. A front portion 12a of the pinion gear 12 extends through a central portion of the rotor 3. The front portion 12a is fixed to the rotor 3 by a nut 33. The pinion gear 12 is rotatably supported by the reel body 2a at two spaced axially spaced apart portions via bearings 14a and 14b, respectively. The spool shaft 15 extends completely through the pinion gear 12. The pinion gear 12 is formed with gear teeth engaged with the gear teeth on the master gear 11 and further engaged with gear teeth on an intermediate gear 23 of an oscillating mechanism 6, described in greater detail below.

Structure of Rotor

As shown in FIG. 2, the rotor 3 includes a cylindrical portion 30 fixed to the pinion gear 12, first and second rotor arms 31 and 32, and a bail arm 40. The first and second rotor arms 31 and 32 are formed on side portions of the cylindrical portion 30 opposed to and parallel to each other. The bail arm 40 is a mechanism for guiding the fishline on to the spool 4 as the rotor 3 rotates about the spool 4. The cylindrical portion 30 and the rotor arms 31 and 32 are made of a material such as an aluminum alloy, and are formed integrally together as a one-piece unit. A front central portion of the cylindrical portion 30 is non-rotatably fixed to the front portion 12a of the pinion gear 12 by the nut 33, as described above.

A front wall 41 is formed on a front portion of the cylindrical portion 30. A boss portion 42 is formed on a central portion of the front wall 41. The boss portion 42 has a through bore formed in the center thereof. The front portion 12a of the pinion gear 12 and the spool shaft 15 extend through the through bore of the boss portion 42, such that the pinion gear 12 is non-rotatably coupled to the through bore.

A reverse rotation prevention mechanism 50 is disposed within the cylindrical portion 30, adjacent to the boss portion 42. The reverse rotation prevention mechanism 50 includes a one-way clutch 51 and a switching mechanism 52. The one-way clutch 51 is a roller type one-way clutch, in which an inner race, which is non-rotatably coupled to the pinion gear 12, freely rotates. The switching mechanism 52 switches the one-way clutch 51 between an active state, in which reverse rotation is prevented, and an inactive state, in which reverse rotation is allowed.

Structure of oscillating Mechanism

As shown in FIGS. 2 and 3, the oscillating mechanism 6 includes a threaded shaft 21 disposed below and parallel to the spool shaft 15, a slider 22 adapted to move back and forth along the threaded shaft 21, and an intermediate gear 23 fixed to a front end of the threaded shaft 21. The slider 22 is movably supported by two guide shafts 24 that are disposed parallel to the threaded shaft 21. A rear end of the spool shaft 15 is non-rotatably coupled to the slider 22. The intermediate gear 23 couples with the pinion gear 12.

Structure of Spool

As shown in FIG. 2, the spool 4 is disposed between the first rotor arm 31 and the second rotor arm 32 of the rotor 3. A central portion of the spool 4 is coupled to the front end of the spool shaft 15 via a drag mechanism 60. The spool 4 includes a winder body 4a, a skirt portion 4b, and a flange board 4c. The fishline is wound about an outer periphery of the winder body 4a. The skirt portion 4b is formed integrally with a back portion of the winder body 4a. The flange board 4c is fixed to a front end of the winder body 4a. The winder body 4a is a cylindrical member, having the outer peripheral surface that is parallel to the spool shaft 15.

Operation of Reel

In the above described spinning reel, the bail arm 40 is pivoted into a casting position so that the fishline can be released during casting. As a result, the fishline is let out from the front end of the spool 4 due to the weight of a lure (not shown).

When the fishline is to be wound up, the bail arm is turned back to a fishline wind-up position. The bail arm comes back to the fishline wind-up position automatically when the handle assembly 1 rotates in a direction that winds up the fishline, because of a bail reverse mechanism which is not shown in the drawings. Rotational torque of the handle assembly 1 is transmitted to the pinion gear 12, via the master gear shaft 10 and the master gear 11. Once torque is transmitted to the pinion gear 12, the torque is further transmitted to the rotor 3 from the front portion 12a of the pinion gear 12, and also to the oscillating mechanism 6 via the intermediate gear 23 which couples to the pinion gear 12. As a result, the rotor 3 rotates in the direction that winds the fishline around the spool 4 while the spool 4 moves back and forth repeatedly to evenly allow winding of the fishline.

In the rotor driving mechanism 5 which transmits a torque from the handle assembly 1 to the rotor 3, the master gear 11 includes the master gear shaft 10 made of a rigid stainless alloy, the gear attachment portion 11a made of a zinc alloy, and the gear member 11b made by forging a light aluminum alloy. Therefore, the master gear 11 can be made lighter while maintaining the rigidity thereof. In other words, even after repeated attachment and detachment of the handle assembly 1, the threads of the master gear shaft 10 do not wear out, nor does a coating applied to the surface of the threads peel off because no such coating is necessary. Therefore, it is less likely that the coupling of the master gear shaft 10 is loosened easily, or corrosion occurs on the threaded surface due to the coating being peeled off.

Other Embodiments (A) Although the gear attachment portion 11a is made of a zinc alloy in the above-described embodiment, the gear attachment portion 11a can also be made of a synthetic resin such as polyacetal resin, which has a high rigidity. The gear attachment portion 11a in this embodiment can also be made integrally with the master gear shaft 10, by inserting the master gear shaft 10 in a metal template and thereafter molding the gear attachment portion 11a, or by forming the master gear shaft 10 and the gear attachment portion 11a separately and thereafter inserting the master gear shaft 10 into the gear attachment portion 11a.

(B) Although the gear attachment portion 11a is made integrally with the master gear shaft 10 in the previous embodiment, the gear attachment portion 11a can also be manufactured separately, and thereafter attached to the master gear shaft 10 by fixing means such as adhesion or serration coupling.

Figure 5:
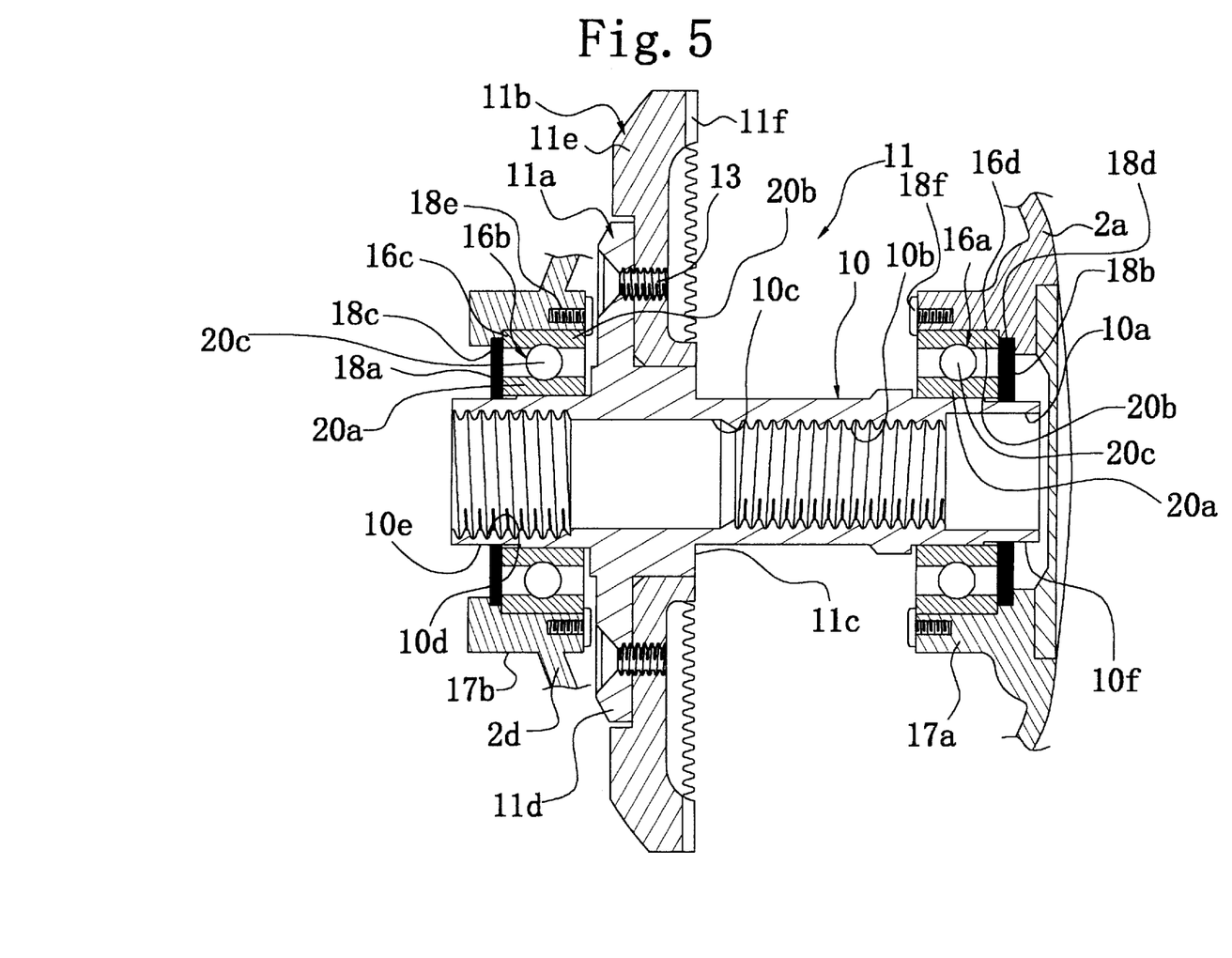
FIG. 5 is a fragmentary cross-sectional view of a master gear in accordance with another embodiment of the present invention.

(C) Although the master gear shaft 10 and the gear attachment portion 11a are made of different materials in the previous embodiment, the master gear shaft 10 and the gear attachment portion 11 can be made of a same material, as shown in FIG. 5. In this case, it is preferable that the master gear shaft 10 and the gear attachment portion 11a be made by forging a stainless steel alloy or brass. It should be understood that all other elements depicted in FIG. 5 are identical to elements with common reference numerals in FIG. 4.

Figure 6:
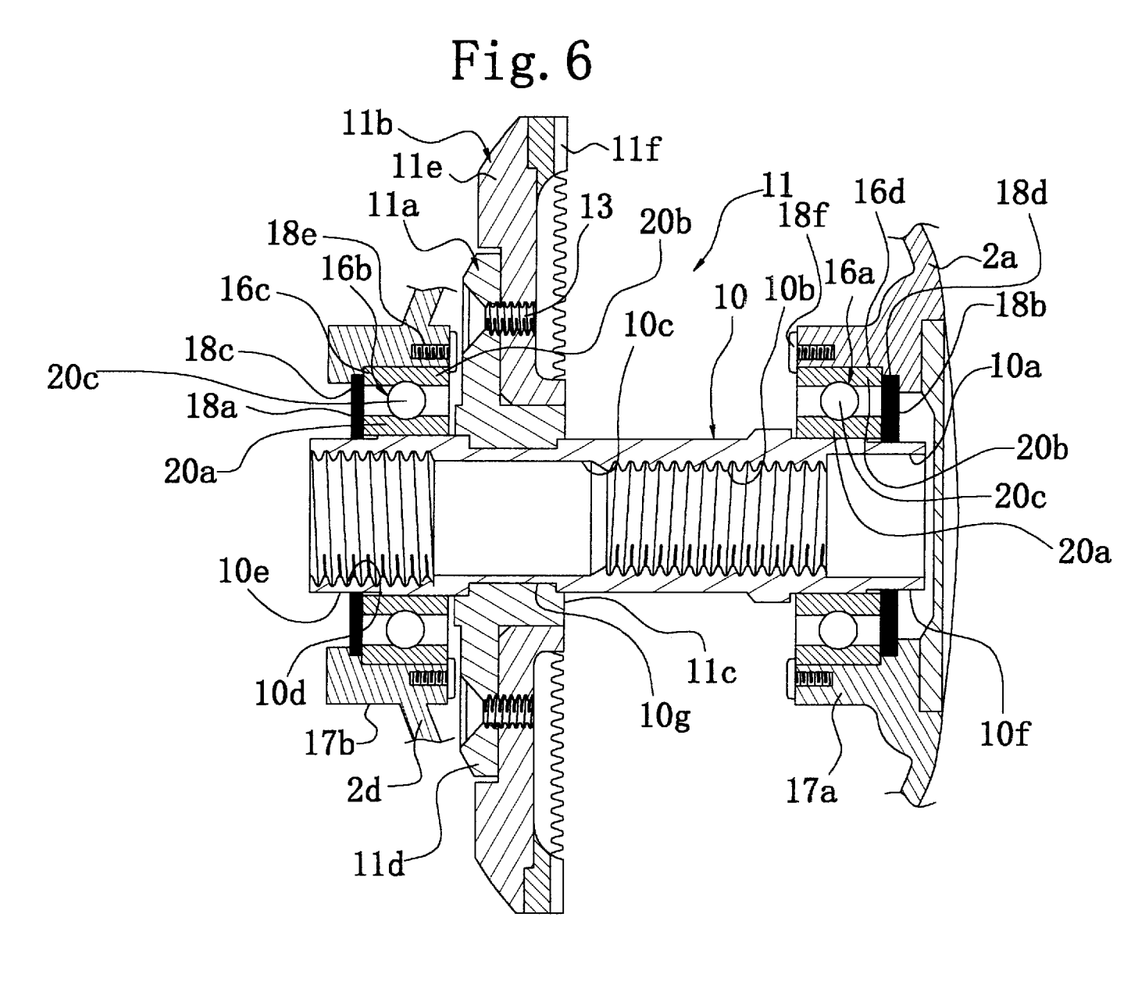
FIG. 6 is a fragmentary cross-sectional view of a master gear in accordance with still another embodiment of the present invention.

(D) Although the disk portion 11b and the face gear portion 11f of the gear member 11b are both made by forging aluminum, the disk portion 11e and the face gear portion 11f can be made integrally but of different materials, as shown in FIG. 6. For instance, the disk portion 11e can be made of an aluminum alloy, while the face gear portion 11f is made by die casting a zinc by inserting the disk portion 11e in a metal template and thereafter molding the face gear portion 11f, or by forming the disk portion 11e and the face gear portion 11f separately and thereafter inserting the disk portion 11e into the face gear portion 11f, where the outer peripheral portion of the disk portion 11e is formed integrally with the face gear portion 11f. It should be understood that all other elements depicted in FIG. 6 are identical to elements with common reference numerals in FIG. 4.

Effect of the Invention

In a master gear according to the present invention, since a disk portion of a gear member is non-rotatably attached to a flange portion of a gear attachment portion which is formed in a shaft portion, the shaft portion can be made of a highly rigid material, while the gear member can be made of a light material, with the gear attachment portion coupling the shaft portion and the gear member. Therefore, the master gear can be made lighter while maintaining the rigidity of the shaft portion.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A master gear for a spinning reel rotatably supported by a reel main body of the spinning reel, said master gear adapted to transmit a rotation of a handle to a rotor via a pinion gear, said master gear comprising:
    a shaft portion rotatably supported by the reel main body at opposite ends thereof, said shaft portion having threads formed on portions of inner surfaces thereof;
    a gear attachment portion having a flange portion, said flange portion being spaced apart from portions of said shaft supported by the reel main body; and
    a gear member having a disk portion and a face gear portion, said disk portion being non-rotatably attached to said flange portion of said gear attachment portion, said face gear portion being disposed on an outer periphery of said disk portion and adapted to engage the pinion gear.

2. A master gear for a spinning reel as set forth in claim 1, wherein
    said gear attachment portion is made integrally with said shaft portion, and said gear attachment portion and said shaft portion being made of the same material.

3. A master gear for a spinning reel as set forth in claim 2, wherein
    said shaft portion and said gear attachment portion are made of a stainless steel alloy.

4. A master gear for a spinning reel as set forth in claim 1, wherein;
    said shaft portion is made of a stainless alloy; and
    said gear attachment portion is made of a material different from said shaft portion.

5. A master gear for a spinning reel as set forth in claim 4, wherein
    said gear attachment portion is made of a synthetic resin.

6. A master gear for a spinning reel as set forth in claim 4, wherein
    said gear attachment portion is made of a zinc alloy.

7. A master gear for a spinning reel as set forth in claim 4, wherein
    said gear attachment portion is formed integrally with said shaft portion.

8. A master gear for a spinning reel as set forth in claim 1, wherein
    said gear member is of forged aluminum alloy.

9. A master gear for a spinning reel as set forth in claim 1, wherein
    said disk portion of said gear member is made of forge aluminum alloy; and
    said face gear portion is made by die casting a zinc alloy so as to be formed integrally with said disk portion.

10. A master gear for a spinning reel as set forth in claim 1, wherein
    said gear member is coupled to said gear attachment portion with a screw.

* * * * *